United States Patent

[11] 3,609,170

| [72] | Inventors | Edward Warren Cantrall<br>New City, N.Y.;<br>Charles Krieger, Clifton, N.J.; Robert<br>Bruce Brownfield, Fairfield, Conn. |
|---|---|---|
| [21] | Appl. No. | 826,256 |
| [22] | Filed | May 20, 1969 |
| [45] | Patented | Sept. 28, 1971 |
| [73] | Assignee | American Cyanamid Company<br>Stamford, Conn.<br>Continuation-in-part of application Ser. No. 753,889, Aug. 20, 1968, now abandoned. |

[54] PROCESS FOR OPTICAL RESOLUTION AND PRODUCTS RESULTING THEREFROM
9 Claims, No Drawings

[52] U.S. Cl. ............................................. 260/397.4, 260/397.45, 260/397.5
[51] Int. Cl. ............................................... C07c169/08
[50] Field of Search .......................................... /Machine Searched Steroids

*Primary Examiner*—Henry A. French
*Attorney*—Ernest Y. Miller

ABSTRACT: This invention relates to the optical resolution of racemic organic compounds using 2-aminobutanol as the resolving agent. The process is particularly useful in the resolution of keto and hydroxysteroids. The steroids are useful as estrogens or progestational agents or convertible into such agents.

PROCESS FOR OPTICAL RESOLUTION AND PRODUCTS RESULTING THEREFROM

BACKGROUND OF THE INVENTION

The therapeutic importance or theoretical chemical significance of many synthetic organic compounds possessing one or more centers of asymmetry often depends upon their optical purity. For example, it is well known that the physiological activity of many synthetic, racemic medicinals resides in but one of the two enantiomorphic forms. For this reason it is highly desirable at some stage in the synthesis of such compounds from simple, optically inactive starting materials, to obtain the desired enantiomorphic form in a pure state. The general term applied to such separations is "optical resolution " and the general process has been applied with great frequency over many decades. In its simplest form the process involves the reaction of a racemic acidic compound with an optically active amine to form a 1:1 mixture of diastereomeric salts whose separation is effected by fractional crystallization as a result of differences in solubility properties. The two pure enantiomorphic forms of the acid are then obtained by acidification of the pure diastereomeric salts and the amine reagent is recovered for reuse. In like manner synthetic racemic bases are resolved using optically active acids.

Neutral racemic compounds may also be resolved by such procedures, but additional chemical transformations are required. For example, a racemic alcohol may be converted to the racemic hemisuccinate or hemiphthalate ester and resolved as described above with an optically active amine. However, in this case, two additional and often inefficient steps are involved (i.e., initial formation of the acid derivative and removal of the extraneous acidic group subsequent to the separation of the diastereomeric salts). The resolving agents in common use are rather complex in structure and are usually of natural origin. Examples of basic resolving agents are brucine, cinchonine, morphine, quinine, strychnine, etc. Examples of acidic resolving agents are the acids camphoric, malic, mandelic, quinic, tartaric, etc.

In spite of the importance of the optical resolution process and its frequent use, few novel departures from the classical procedure have come into general use. A major disadvantage of the process as commonly practiced is the often prohibitive cost of the required optically active resolving agent, particularly in production-scale optical resolutions. An additional and serious disadvantage is the limited number of ways in which the process may be successfully applied to the resolution of neutral racemic compounds.

While engaged in studies involving 1-and d-2-aminobutanol, we have found that one or both of the optically active amines offer an economical substitute for the basic resolving agents in common use. Initial attempts to establish such use involved a modification of a published procedure (G.C. Buzby, Jr., et al. J. Med. Chem., 10, 199 (1967) for the resolution of the racemic hemisuccinate ester of dl-3-methoxy-17μ-hydroxy-13μ-ethylgona-1, 3, 5(10)-triene. Simple substitution of 1-2aminobutanol for the resolving agents of the published process was carried out with care but was unsuccessful.

It has now been found that racemic hemisulfate esters form nicely crystalline (and easily separable) diastereomeric salts with 1-(or d)-2 -aminobutanol. This observation forms the basis for a novel and efficient method for the resolution of racemic alcohols.

SUMMARY OF THE INVENTION

In its broadest concept the present process applied to a racemic alcohol can be illustrated as follows:

FLOW CHART I

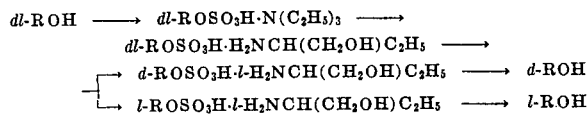

wherein ROH is a racemic organic alcohol. The racemic hemisulfate ester, triethylamine salt is formed. The next step entails exchange of the triethylamine residue for an optically active amine (1-2-aminobutanol is the example in the flow chart) thereby producing a mixture of diastereomeric salts which are separable by fractional crystallization. Following purification of the diastereomeric salts, each is converted efficiently and under exceptionally mild conditions to the pure enantiomorphic alcohol.

In accordance with a further process of the present invention, a racemic ketone is reacted with an optically active amine such as 1-2-aminobutanol to produce a mixture of the diastereomeric imine derivatives. The latter are separated by fractional crystallization as the free bases or, alternatively, as appropriate acid addition salts as shown in the following flow chart

FLOW CHART II

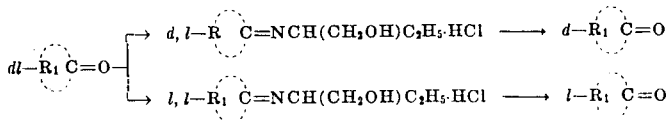

wherein

represents a racemic organic compound, such as a keto steroid. Hydrolysis of each of the separated and purified diastereomeric imines (or salts thereof) then provide the two enantiomorphs in pure form.

More specifically, the instant invention may be applied to dl-steroids having a hydroxyl or keto group in the 17-position. The hydroxy compounds are reacted with triethylamine-sulfur trioxide to obtain the dl-steroid 17-sulfate triethylamine salt. The latter salt is reacted with, for example, 1-2-aminobutanol which produces a mixture of the 1-steroid 17-sulfate 1-2-aminobutanol salt and the d-steroid 17-sulfate 1-2-aminobutanol salt. Fractional crystallization of the mixed diastereomers form a solvent such as absolute ethanol separates the d, 1-salt from the 1,1-salt. The resolving agents (1-2-aminobutanol) and the sulfate groups are then removed by heating in a solvent to produce pure d and 1 forms of the hydroxysteriod.

Similarly, ketosteroids are condensed with an optically active primary amine such as 1-2-aminobutanol in the presence of a catalytic amount of acid such as p-toluenesulfonic acid. The resultant mixed diastereomeric imines, on their acid addition salts, are separated by fractional crystallization. The optically active ketones are then regenerated from their respective imine, or imine salt, derivatives by treatment with aqueous alcoholic alkali.

As described hereinafter in the examples, the sulfation step is carried out conveniently and efficiently using triethylamine-sulfur trioxide in solvent pyridine. A reaction period of about 3 hours at a temperature of about 80°–90° C. is usually sufficient for the conversion. In practice the racemic triethylammonium sulfate ester is not isolated but is converted directly to a mixture of diastereomeric salts by exchanging the triethylamine residue for an optically active amine. For example, a methylene chloride-ether solution of the racemic triethylammonium sulfate ester may be treated with an excess of 1-2-aminobutanol after which the diastereomeric 1-2-aminobutanol salts are precipitated by the addition of ether. Separation of the diastereomers is accomplished by fractional crystallization from a suitable solvent or solvent pair. In the examples absolute ethanol proved satisfactory for this purpose. The separated and purified diastereomeric salts are then converted (by desulfation) to the parent alcohols which, as a result of the foregoing procedure, are now in their optically pure forms. The hydrolysis of the sulfate salts is carried out conveniently and in high yield merely by dissolution in dioxane, applying mild heat (steam-bath temperature) for a brief period (as little as 5 minutes, for example) and then recovering the desired alcohol by removal of solvent and precipitation with water. The optically active alcohols are then further purified by processes well known to those skilled in the art.

The condensation of a racemic ketone with an optically active primary amine (for example 1-2-aminobutanol) is conveniently accomplished using the amine as solvent and with a catalytic amount of acid (for example p-toluenesulfonic acid) present. Heating at the reflux temperatures for a period of 3 to 4 hours is usually sufficient to effect complete conversion. Inert solvents may also be employed as diluents providing the boiling temperatures of such solvent is sufficient for initiation of the reaction. The mixed imine diastereoisomers may be isolated for fractional crystallization by removal of the solvent-reactant under reduced pressure, then crystallization in the usual manner. The crude reactant-free diastereomeric imines are separated by fractional crystallization from a suitable solvent or solvent pair. Alternatively, the crude reactant free diastereomeric imines are separated by fractional crystallization from an acidified alkanol (ethanolic hydrochloric acid, for example) in which case the separated and purified imine diastereoisomers are in the form of their acid addition salts. Regeneration of the optically active ketones from their respective imine (or imine salt) derivatives is conveniently accomplished by dissolution in dilute aqueous alcoholic alkali and heating at the reflux temperature for from 3 to 15 hours or longer. The liberated ketones are isolated in the usual way (solvent precipitation, extraction, etc.) then further purified by recrystallization.

DESCRIPTION OF THE PREFERRED EMBODIMENT

Although 1-2-aminobutanol (or its optical antipode, d-2-aminobutanol) is the preferred optically active amine resolving agent for the resolution of racemic alcohols according to the first-described novel invention process, any of the optically active amines in common use for effecting optical resolution may be used. Important examples of racemic alcohols which may be resolved by application of the first-mentioned invention process are the racemic forms of totally synthetic hydroxyl-containing compounds of medicinal interest. These include estrogens, androgens, chloramphenicol, pantothenic acid, etc., as well as their substituted analogs. For example, among the appended examples is described the resolution of a totally synthetic homolog of estradiol methyl ether.

The preferred optically active amine useful in the resolution of racemic ketones, is 1-2-aminobutanol (or its optical antipode, d-2-aminobutanol). However, other optically active amines can be used as resolving agents. Such amines are directly applicable to the process if they are primary amines. Specific examples of such amines are the optically active forms of $\alpha$-phenylethylamine, menthylamine and the like. Examples of racemic ketones which may be resolved according to this invention process include such complex totally synthetic compounds as estrone, androstenolone, pregnenolone, etc., and any of their anologs.

DETAILED DESCRIPTION

The following examples describe in detail the resolution of dl steroids into the d and l isomers.

EXAMPLE 1.

Preparation of dl-3-Methoxy-17$\beta$-sulfoxy-13$\beta$-ethylgona-1, 3, 5(10)-triene, triethylamine salt dl-3-Methoxy-17$\beta$-hyroxy-13$\beta$-ethylgona-1, 3, 5(10)-triene, 2.00g. (6.64 mmol) is dissolved in a solution composed of pyridine (8.0 ml.) and triethylamine-sulfur trioxide (1.32 g., 7.30 mmol). The reaction solution is heated (80°–90 ° C.) with stirring for 2.5 hours, then cooled to room temperature and poured with stirring into anhydrous ether (175 ml.). The resulting solid is removed by filtration, washed with ether containing a small volume of methylene chloride then air dried to give dl-3 -methoxy-17$\beta$-sulfoxy-13 $\beta$-ethylgona-1, 3, 5(10 )-triene, triethylamine salt, 2.42 g. (5.02 mmol, 75.5percent).

In place of triethylamine-sulfur trioxide we can use sulfur trioxide-pyridine complex and other sulfur trioxide tertiary amine complexes belonging to the class of sulfonating agents.

EXAMPLE 2

Preparation of Diastereometric 1-2-aminobutanol salts of d- and 1-3methoxy-17$\beta$-sulfoxy-13$\beta$-ethylgona-1, 3, 5(10 )-triene dl-3-Methoxy-17$\beta$-sulfoxy-13$\beta$-ethylgona-1, 3, 5(10 )-triene, triethylamine salt, 500mg. (1.04 mmol), is dissolved in a 1:1 mixture of methylene chloride-ether. 1-2-Aminobutanol, 2.5 ml. (2.65 mmol), is dissolved in 5 ml. of the same solvent pair and added to the steroid solution with stirring. The solution is allowed to stand at room temperature for one-half hour, then concentrated to an oil under reduced pressure. The oil is added in a steady stream and with stirring to 300 ml. anhydrous ether. The resulting solid is removed by filtration, washed with anhydrous ether, then air dried to give 453 mg. (0.965 mmol, 92.8 percent) of the mixed diastereomeric 1-2 -aminobutanol salts of d-and 1-3-methoxy-17$\beta$-sulfoxy-13 $\beta$-ethylgona-1, 3, 5(10 )-triene.

Fractional crystallization of the mixed diastereoisomers from absolute ethanol gives first the dextrorotatory salt d-3-methoxy-17$\beta$-sulfoxy-13$\beta$-ethylgona-1, 3, 5(10 )-triene, 1-2-aminobutanol salt, $[\alpha]_D^{23°} + 22.5°$ (ethonal), then the levorotatory salt 1-3-methoxy-17 $\beta$-sulfoxy-13 $\beta$-ethylgona-1, 3, 5-(10 )-triene, 1-2 -aminobutanol salt, $[\alpha]_D^{23°} - 17.2°$ (ethanol).

EXAMPLE 3

Preparation of d-3 -Methoxy-17 $\beta$-hydroxy-13-$\beta$-ethylgona-1, 3, 5 (10 )-triene d-3 -Methoxy-17$\beta$-sulfoxy-13$\beta$-ethylgona-1, 3, 5(10 )-triene, 1-2-aminobutanol salt, 50.0 mg. (0.106 mmol), dissolved in dioxane (5 ml.) is heated on the steam bath for 5 minutes then cooled to room temperature. The solution is concentrated to an oil under reduced pressure. Addition of water to the oily residue produces colorless solid which is removed by filtration giving d-3-methoxy-17 $\beta$-hydroxy-13$\beta$-ethylgona-1, 3, 5(10 )-triene: 27.2 mg. (0.0905 mmol, 85 percent); $[\alpha]_D^{23°} + 53° \pm 3°$ (CHCl$_3$) (lit. + 59°, 49.5°).

EXAMPLE 4

Preparation of 1-3-Methoxy-17$\beta$-hydroxy-13$\beta$-ethylgona-1, 3, 5(10 )-triene, 1-3-Methoxy-17$\beta$-sulfoxy-13 $\beta$-ethylgona-1, 3, 5 (10 )-triene, 1-2-aminobutanol salt, 25.0 mg. (0.0532 mmol), when hydrolyzed according to the procedure of example 3 affords 1-3-methoxy-17$\beta$-hydroxy-13$\beta$-ethylgona-1, 3, 5(10 )-triene: 13.4mg. (0.0446 mmol, 84 percent); $[\alpha]_D^{23°} - 41° \pm 3°$ (CHCl$_3$) (lit. −56°).

EXAMPLE 5

Preparation of Mixed (1,1-and (d,1)-3-Methoxy-17 -(1-ethyl-2-hydroxyethylimino)-13$\beta$-ethylgona-1, 3, 5(10 )-triene dl-3-Methoxy-13$\beta$-ethylgona-1, 3, 5(10 )-17-one, 2.00 g. (6.70 mmol), is suspended in 1-2-aminobutanol (135 ml.) and p-toluenesulfonic acid-monohydrate (100 mg.) is added. The stirred suspension is heated to the reflux temperature and maintained there (solution temperature ca. 175 ° c.) for 5.5 hours. The reactant-solvent is removed under reduced pressure and the residue is crystallized from methanol to give 2.19 g. (5.93 mmol, 88.5 percent) of mixed (1,1)-and (d,1)-3-methoxy-17-(1ethyl-2-hydroxyethylimino)-13$\beta$-ethylgona-1, 3, 5(10 )-triene in several crops.

EXAMPLE 6

Preparation of (1,1)-and (d,1)-3-methoxy-17-(1-ethyl-2-hydroxyethylimino-13β-ethylgona-1, 3, 5(10)-triene, hydrochlorides d13-Methoxy-13β-ethylgona-1, 3, 5(10)-triene-17-one, 10.00 g. (33.5 mmol) is suspended in 1-2-aminobutanol (150 ml.) and p-toluenesulfonic acid monohydrate (100 m.g.) is added. The stirred suspension is heated to the reflux temperature (complete solution occurs at about 80° C.) and maintained there (solution temperature ca. 175° C.) for 4 hours. Half the reactant-solvent is removed under reduced pressure after which slow distillation at atmospheric pressure reduces the reaction volume to about 15 ml. (1.25 hours). The crude product is crystallized by trituration with a mixture of water (30 ml.) and methanol (40 ml.) and the solid so produced is crystallized from absolute ethanol (260 ml.) containing concentrated hydrochloric acid (3.50 ml.). Five crops of colorless crystalline solid are obtained totaling 11.67 g. (28.7 mmol, 85.7 percent). The levorotatory crops [the (1,1-diastereoisomer is least soluble and predominates in the early crops] are combined and recrystallized from acidic ethanol (1 ml. concentrated hydrochloric acid is diluted to 100 ml. with absolute ethanol) to constant specific rotation: (1,1)-3-methoxy-b 17-(1-ethyl-2-hydroxymethylimino)-13β-ethylgona-1, 3, 5(10)-triene, hydrochloride; $[\alpha]^{23}{}_D$ −65° C. (MeOH, trace DMF). The dextrorotatory crops [the (d,1-)-diastereoisomer is the more soluble and predominates in the later crops] are combined and recrystallized to constant specific rotation from acidic ethanol as previously described: (d,1)-3-methoxy-17-(1-ethyl-2-hydroxyethylimino)-13β-ethylgona-1, 3, 5(10)-triene, hydrochloride; $[\alpha]^{23°}{}_D$ + 63 (MeOH).

EXAMPLE 7

Preparation of d-3-Methoxy-13β-ethylgona-1, 3, 5(10)-triene-17-one (d,1)-3-Methoxy-17-ethyl-2-hydroxyethylimino)-13β-ethylgona-1, 3, 5(10)-triene, hydrochloride, 123 mg. (0.303 mmol), is suspended in 100 ml. 50 percent aqueous ethanol 0.1N in sodium hydroxide and heated at the reflux temperature for 3.3 hours. The reaction solution is acidified (hydrocholoric acid) to pH 4–5, concentrated under reduced pressure to a substantially aqueous state, then adjusted to pH 5–6 with dilute sodium hydroxide solution. The ketone product is extracted into ether. Removal of the ether solvent gives 70 mg. (0.235 mmol, 77.6 percent) of product. The latter is dissolved in a mixture of ethanol (30 ml.) and 0.05N hydrochloric acid (15 ml.) and the solution is concentrated to a substantially aqueous condition under reduced pressure. The product is separated by filtration then recrystallized from aqueous ethanol: d-3-methoxy-13β-ethylgona-1, 3, 5(10)-triene-17-one; [)-triene, $[\alpha]_D^{23°}$ 101 (CHCl₃): melting point 152.5–155.0°.

EXAMPLE 8

Preparation of 1-3-Methoxy-13β-ethylgona-1, 3, 5(10)-triene-17-one (1,1)-3-Methoxy-17 -(1-ethyl-2-hydroxyethylimino)-13β-ethylgona-1, 3, 5(10 90 mg. (0.222 mmol), is dissolved in a solution composed of ethanol (12 ml.) and 5N sodium hydroxide (8 ml.) and heated under reflux for 15 hours. The product is recovered and purified according to the procedure described in example 7: 1-3-methoxy-13β-ethylgona-1, 3, 5(10)-triene-17-one; $[\alpha]_D^{23°}$ −94° (CHCl₃) [lit.-101.5 (CHCl₃/methanol 1:1)].

EXAMPLE 9

Preparation of d-3-Methoxy-17β-hydroxy-13β-ethylgona-1, 3, 5(10), 8-

The steriod dl-3-Methoxy-17β-hydroxy-13β-ethylgona-1, 3, 5(10),8tetraene, 3.00 g. (10 mmol), (J. Chem. Soc. 4472–92 (1964)) is dissolved in a solution of 2.00 g. (11.1 mmol) triethylamine-sulfur trioxide in 12.0 ml. pyridine. The reaction solution is heated (80°–90 20 C.) with stirring for 2.5 hours, then cooled to room temperature and poured, with stirring, into 265 ml. anhydrous ether. The solid is collected by filtration, washed with ether containing a small amount of methylene chloride, and then air dried. Two grams (4.16 mmol) of solid is dissolved in a 1:1 mixture of methylene chloride-ether and to this solution is added, with stirring, 10.0 ml. (106 mmol) of 1-2 -aminobutanol dissolved in the same solvent pair. After one-half hour the solution is concentrated to an oil under reduced pressure. The oil is added in a steady stream to 1 liter of anhydrous ether. The diastereomeric mixture of the 1-2-aminobutanol salts of d and 1-3-methoxy-17β-sulfoxy-13β-ethylgona-1, 3, 5(10), 8-tetraene is collected by filtration, washed with anhydrous ether and air dried.

Fractional crystallization from absolute ethanol affords first the salt of the d-steroid, then the salt of the l-steroid. A 1 percent solution of the d-3-methoxy-17β-sulfoxy-13β-ethyl gona-1, 3, 5(10), 8-tetraene, 1-2-aminobutanol salt is dioxane is heated on a steam bath for 5 minutes, then cooled to room temperature. The solution is concentrated to an oil under reduced pressure, and worked up to give the product of the example.

EXAMPLE 10

Preparation of 1-3-Methoxy-17 β-hydroxy-13β-ethylgona-1, 3, 5(10),8-

The 1-3-methoxy-17 β-sulfoxy-13β-ethylgona-1, 3, 5(10),8-tetraene, 1-2-aminobutanol salt, described in the preceding example 9 is heated in dioxane according to the procedure described therein and worked up to give the above product.

EXAMPLE 11

Preparation of d-3-Methoxy-13 β-ethylgona-1, 3, 5(10),8-tetraene-17-

The steroid dl-3-methoxy-13β-ethylgona-1, 3, 5(10),8-tetraene-17-one, 1.00 g. (3.38 mmol) (J. Chem. Soc. 4472–92 (1964)) is suspended in 15 ml. 1-2-aminobutanol and 10 mg. p-toluenesulfonic acid monohydrate is added. The stirred suspension is heated to the reflux temperature (ca. 175° C.) and maintained there for 5.5 hours. The reaction mixture is concentrated under reduced pressure, to a volume of less than 2 ml., cooled and diluted with 5 ml. water. The solids are collected by filtration, washed with aqueous methanol (1:1), and air dried. To the product, dissolved in 12.5 ml. of hot ethanol, is added 0.9 ml. of a concentrated hydrochloric acid-ethanol mixture (1:1). The solution is allowed to cool slowly, and several crops of materials are collected separately. Those crops rich in the 1,1-diastereoisomer are combined as are the crops rich in the d,1-diastereoisomer. The latter material is recrystallized from ethanol and refluxed in ethanol-water (2:1) which is 0.13N in sodium hydroxide, for 3 hours. The reaction mixture is neutralized and, after cooling, the resultant precipitate is collected and recrystallized to constant specific rotation from methanol to give the product of the example.

EXAMPLE 12

Preparation of 1-3-Methoxy-13β-ethylgona-1, 3, 5(10),8-tetraene-17-one

Material rich in the 1,1-diastereoisomer, described in the preceding example 11, is recrystallized from ethanol and refluxed in ethanol-water (2:1), which is 0.13N in sodium hydroxide, for 5.5 hours. The reaction mixture is neutralized and after cooling, the precipitate is collected and recrystallized to constant specific rotation from methanol to yield the above product.

We claim:

1. A process for resolving a racemic steroid with an aromatic A ring and an alcohol moiety in the 17-position which comprises heating said alcohol with a tertiary-alkylamine-sulfurtrioxide to produce a corresponding sulfate half ester alkyl amine salt, contacting the amine salt with an optically active primary amine, selected from the group consisting of 1-2-aminobutanol, d-2-aminobutanol, α-phenylethylamine and methylamine, separating the d and l forms by fractional crystallization and hydrolyzing the separated steroids to yield the d steroid alcohol and the l steroid alcohol.

2. A process for resolving a racemic steroid with an aromatic A ring and a ketone moiety in the 17 -position which comprises heating said ketone with an optically active primary amine, selected from the group consisting of 1-2-aminobutanol, d-2-aminobutanol, α-phenylethylamine and methylamine, separating the d and l forms by fractional crystallization and hydrolyzing the separated steroids to yield the optically active d steroid ketone and l steroid ketone.

3. A process of resolving dl-3-methoxy-17 β-hydroxy -13 β-ethylgona-1, 3, 5(10)-triene into the d and l forms which comprises heating dl-3-methoxy-17α-hydroxy-13α-ethylgona-1, 3, 5(10)-triene with triethylaminesulfur trioxide. contacting the resulting triethylamine salt with l-2-aminobutanol, separating the d-steroid sulfate l-2-aminobutanol salt from the l-steroid sulfate, l-2-aminobutanol salt by fractional crystallization, removing the l-2-aminobutanol and the sulfate by hydrolysis in each instance and recovering d-3-methoxy-17β-hydroxy-13β-ethylgona-1, 3, 5(10)-triene and l-3-methoxy-17β-hydroxy-13β-ethylgona-1, 3, 5(10)-triene therefrom.

4. A process, in accordance with claim 2, of resolving dl-3-methoxy-13β-ethylgona-1, 3, 5(10)-triene-17-one, into the d and l forms, which comprises heating a mixture of d l-3-methoxy-13β-ethylgona-1, 3, 5(10)-triene-17-one, with l-2 - aminobutanol, in the presence of an acid catalyst, separating the resulting d,l- and 1,1-diastereomeric imines by fractional crystallization and after hydrolysis of the respective imines, recovering the d-3-methoxy13β-ethylgona-1, 3, 5(10)-triene-17-one and the l-3 -methoxy-13β-ethylgona-1, 3, 5(10)-triene-17-one compounds therefrom.

5. The process of resolving dl steroidal alcohols according to claim 1, wherein the starting material is dl-3-methoxy-17β-hydroxy-13β-ethylgona-1, 3, 5(10), 8-tetraene and the product obtained is d-3-methoxy-17β-hydroxy-13β-ethylgona-1, 3, 5(10),8-tetraene.

6. The process of resolving dl steroidal ketones according to claim 2, wherein the starting material is dl-3-methoxy-13β-ethylgona-1, 3, 5(10), 8-tetraene-17-one and the product obtained is d-3-methoxy-13β-ethylgona-1, 3, 5(10),8-tetraene-17-one.

7. The compound, d-3-methoxy-17β-sulfoxy-13β-ethylgona-1, 3, 5(10)-triene, l-2-aminobutanol salt.

8. The compound d, l-3-methoxy-17(1-ethyl-2-hydroxyethylimino)-13β-ethylgona-1, 3, 5(10)-triene.

9. The compound l,l-3-methoxy-17(1-ethyl-2-hydroxyethylimino)-13β-ethylgona-1, 3, 5(10)-triene.

UNITED STATES PATENT OFFICE
CERTIFICATE OF CORRECTION

Patent No. 3,609,170      Dated September 28, 1971

Inventor(s) Edward Warren Cantrall, Charles Krieger and Robert Bruce Brownfield

It is certified that error appears in the above-identified patent and that said Letters Patent are hereby corrected as shown below:

Column 5, in the title of Example 9, line 73, please complete the title to read:

-- Preparation of d-3-Methoxy-17β-hydroxy-13β-ethylgona-1,3,5(10),8-tetraene. --

Column 6, in the title of Example 10, line 29, please complete the title to read:

-- Preparation of 1-3-Methoxy-17β-hydroxy-13β-ethylgona-1,3,5(10),8-tetraene. --

Column 6, in the title of Example 11, line 38, please complete the title to read:

-- Preparation of d-3-Methoxy-13β-ethylgona-1,3,5(10),8-tetraene-17-one. --

Signed and sealed this 28th day of March 1972.

(SEAL)
Attest:

EDWARD M. FLETCHER, JR.      ROBERT GOTTSCHALK
Attesting Officer      Commissioner of Patents